(12) United States Patent
Ito

(10) Patent No.: US 11,685,442 B2
(45) Date of Patent: Jun. 27, 2023

(54) VEHICLE

(71) Applicant: SUBARU CORPORATION, Tokyo (JP)

(72) Inventor: Hiroyasu Ito, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 134 days.

(21) Appl. No.: 17/221,010

(22) Filed: Apr. 2, 2021

(65) Prior Publication Data

US 2021/0309296 A1    Oct. 7, 2021

(30) Foreign Application Priority Data

Apr. 6, 2020  (JP) .............................. JP2020-068320

(51) Int. Cl.
| | |
|---|---|
| *B32B 7/08* | (2019.01) |
| *B62D 21/15* | (2006.01) |
| *B62D 29/04* | (2006.01) |
| B62D 25/04 | (2006.01) |
| B62D 25/06 | (2006.01) |
| B62D 25/02 | (2006.01) |

(52) U.S. Cl.
CPC .............. *B62D 21/157* (2013.01); *B32B 7/08* (2013.01); *B62D 29/04* (2013.01); *B32B 2605/003* (2013.01); *B62D 25/025* (2013.01); *B62D 25/04* (2013.01); *B62D 25/06* (2013.01)

(58) Field of Classification Search
None
See application file for complete search history.

(56) References Cited

U.S. PATENT DOCUMENTS

2018/0304931 A1* 10/2018 Kato ....................... B62D 25/04
2019/0283809 A1*  9/2019 Kondo ................... B62D 21/15

FOREIGN PATENT DOCUMENTS

JP        2013-193637 A       9/2013

* cited by examiner

*Primary Examiner* — Alexander S Thomas
(74) *Attorney, Agent, or Firm* — Troutman Pepper Hamilton Sanders LLP

(57) ABSTRACT

A vehicle includes a fiber reinforced resin member, a reinforcing member, and a fixer. Thea fiber reinforced resin member at least includes a fragile portion. The reinforcing member covers the fragile portion and reinforces the fragile portion. The fixer fixes the reinforcing member to the fiber reinforced resin member.

16 Claims, 4 Drawing Sheets

CROSS-SECTION VIEW TAKEN ALONG A-A

CROSS-SECTION VIEW TAKEN ALONG A-A

CROSS-SECTION VIEW
TAKEN ALONG B-B

VEHICLE

CROSS-REFERENCE TO RELATED APPLICATIONS

The present application claims priority from Japanese Patent Application No. 2020-068320 filed on Apr. 6, 2020, the entire contents of which are hereby incorporated by reference.

BACKGROUND

The disclosure relates to a vehicle having a vehicle body at least partially made of a fiber reinforced resin member.

In recent years, for the purpose of reducing the weight of a vehicle platform, it has been studied to form a vehicle body structure using carbon fiber reinforced resin. For example, Japanese Unexamined Patent Application Publication (JP-A) No. 2013-193637 discloses a center pillar structure made of carbon fiber reinforced resin. JP-A No. 2013-193637 describes that a coupling member of an aluminum casting product is interposed at a coupling portion between a center pillar and a side sill where an impact force is expected to be concentrated when the side of the vehicle is impacted (also referred to as side collision). Accordingly, JP-A No. 2013-193637 discloses enhancing the shock absorbing effect at the time of the side collision of the vehicle, so as to prevent deformation of a vehicle cabin as much as possible.

SUMMARY

An aspect of the disclosure provides a vehicle including a fiber reinforced resin member, a reinforcing member, and a fixer. The fiber reinforced resin member at least includes a fragile portion. The reinforcing member covers the fragile portion and reinforces the fragile portion. The fixer fixes the reinforcing member to the fiber reinforced resin member.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to explain the principles of the disclosure.

DETAILED DESCRIPTION

Figure 1:
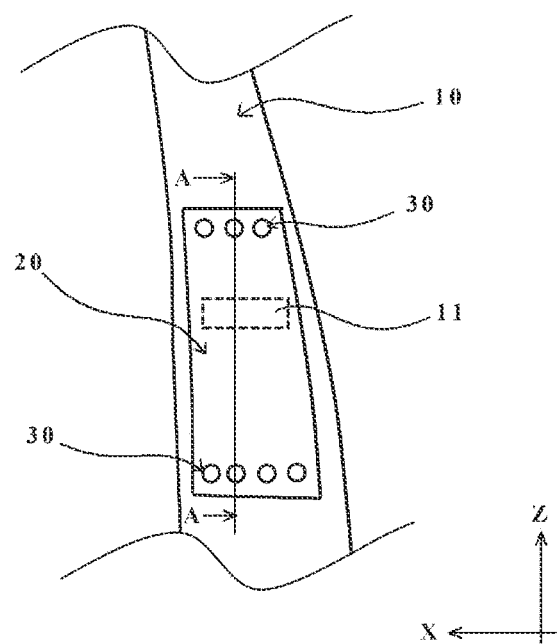
FIG. 1 is a schematic view partially illustrating a vehicle including a fiber reinforced resin member of an embodiment.

JP-A No. 2013-193637 discloses that a coupling member of an aluminum casting product generates a large reaction force while being ductilely deformed so as to be curved inward in a vehicle width direction due to a collision load, and the collision load is effectively absorbed by the ductility. However, the fiber reinforced resin member and a metal member behave in significantly different manners in response to the impact force, and the fracture mode of the fiber reinforced resin member is generally brittle. Because of these, when the fiber reinforced resin member is coupled via the metal member as described in JP-A No. 2013-193637, depending on a direction or magnitude of the collision force, there is a possibility that the metal member is not ductilely deformed as expected, and the fiber reinforced resin member around the metal member causes unexpected brittle fracture.

It is desirable to provide a vehicle having a structure that can avoid unintended brittle fracture of a fiber reinforced resin member while improving a shock absorption performance at a portion where an impact force is expected to be concentrated at a time of side collision.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. In the specification and the drawings, plural elements having substantially the same functional configuration may be distinguished by adding different alphabets after the same reference numerals. It is noted that when it is not necessary to distinguish plural elements having substantially the same functional configuration from each other, the same reference numerals may be simply given.

First, the configuration of a vehicle 100 according to an embodiment of the disclosure will be described with reference to FIGS. 1 to 3. FIG. 1 schematically illustrates a part (for example, a pillar) of a vehicle body of a passenger vehicle (that is, the vehicle 100). In the specification, a front-rear direction (that is, a vehicle longitudinal direction) of the vehicle is referred to as an "X direction", a vehicle width direction is referred to a Y direction, and a height direction of the vehicle is referred to as a Z direction (see the figures).

Figure 3:
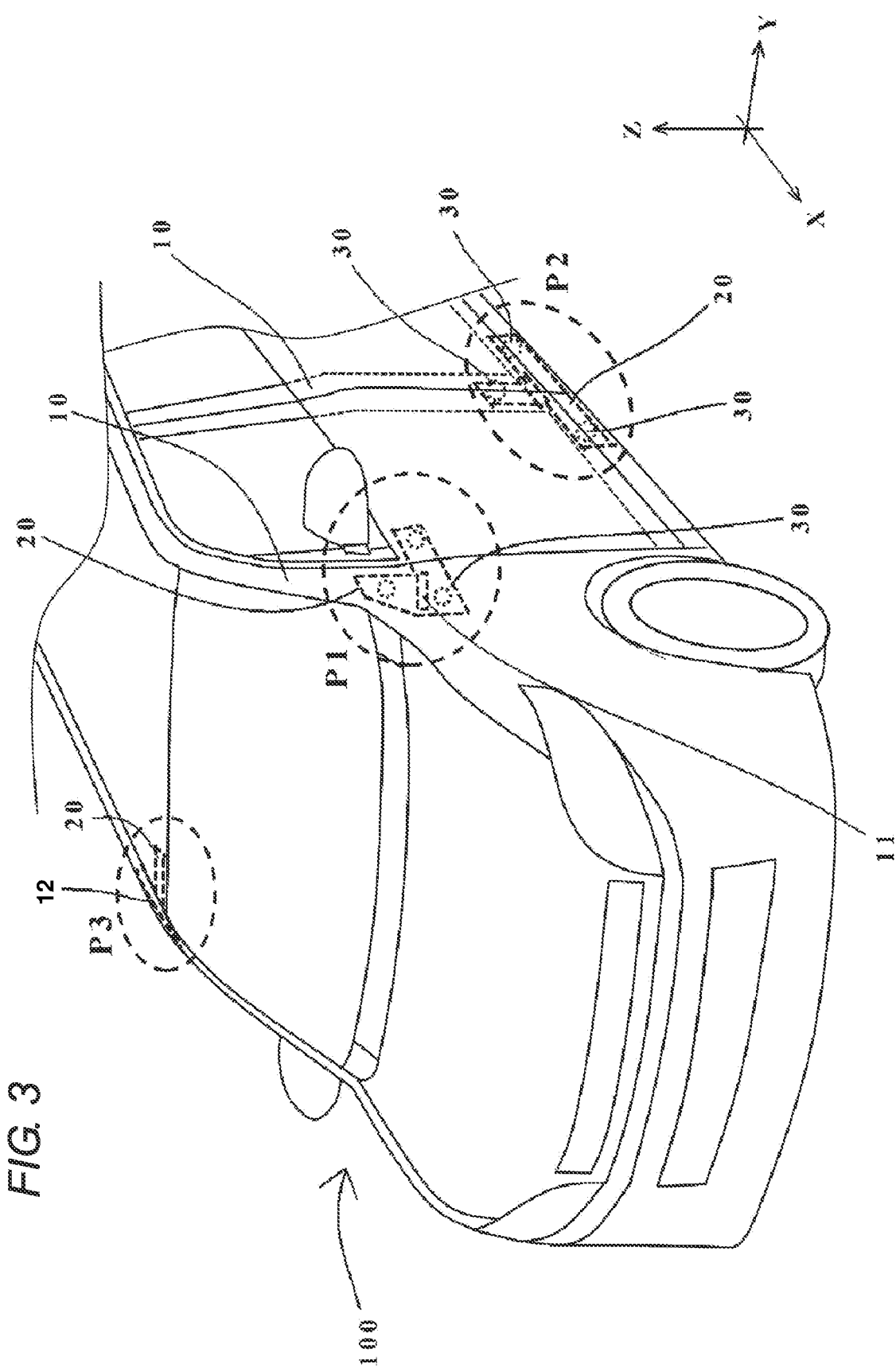
FIG. 3 is a schematic view partially illustrating an appearance of a vehicle in which the fiber reinforced resin members are disposed at plural different positions.

The vehicle 100 includes a vehicle body having a front pillar, a center pillar, a roof pillar, a side sill, a rooftop member, and the like, as illustrated in FIG. 3 as a representative example. Among these members, a fiber reinforced resin member 10 is used in at least a part of the vehicle body of the vehicle 100 of the embodiment.

In the embodiment, the front pillar (A pillar) is exemplified as a portion where the fiber reinforced resin member 10 is applied to the vehicle body of the vehicle. It is noted that the disclosure is not limited to the example in which the front pillar includes the fiber reinforced resin member 10. The fiber reinforced resin member 10 may be separately applied to respective portions of the vehicle body (such as a center pillar and a side sill). Alternatively, the entire vehicle body may be formed of the fiber reinforced resin member 10.

Figure 2:
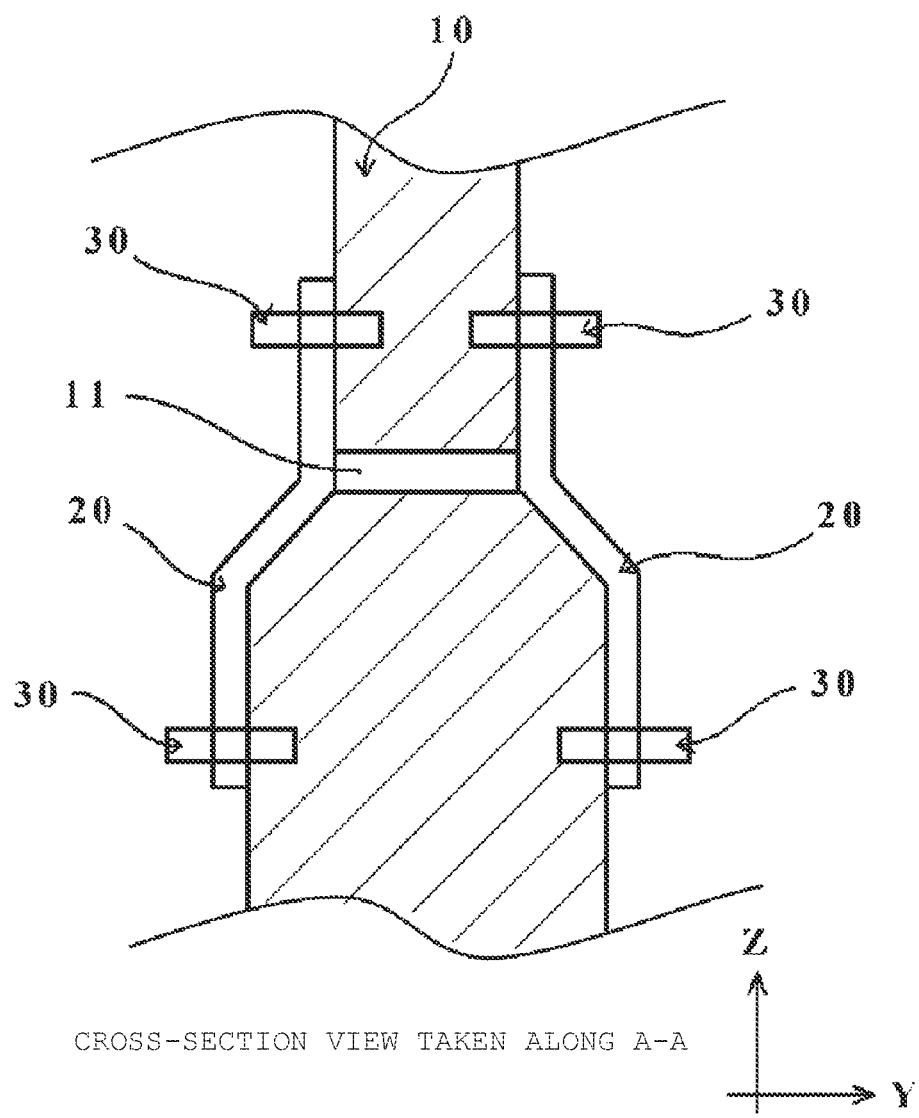
FIG. 2 is a schematic cross-section view illustrating a structure taken along an A-A line in FIG. 1.

In other words, as illustrated in FIGS. 1 and 2, the vehicle 100 of the embodiment includes at least the fiber reinforced resin member 10, reinforcing members 20, and fixers 30.

The fiber reinforced resin member 10 is, for example, carbon fiber reinforced plastic (CFRP) in which the resin is reinforced with carbon fibers. At least a part of the fiber reinforced resin member 10 is a fragile portion 11.

The fiber reinforced resin member 10 is not limited to CFRP. For example, in addition to GFRP obtained by reinforcing resin with glass fiber, various known fiber reinforced resins such as boron fiber reinforced plastic (BFRP), Kevlar fiber reinforced plastic (KFRP), and aramid fiber reinforced plastic (AFRP) may be applied to the fiber reinforced resin member 10.

As illustrated in FIG. 1 and the like, the fiber reinforced resin member 10 of the embodiment has the fragile portion 11 having a relatively low strength as compared with the other regions.

The fragile portion 11 has a function of being preferentially destroyed in the fiber reinforced resin member 10 by, for example, the above-described impact force at the time of side collision. Any of various known structures may be employed as a specific structure of such a fragile portion 11 if the above-described function is exhibited. In this embodiment, the fragile portion 11 is a rectangular weight-reducing opening formed by removing a part of the fiber reinforced resin member 10.

As described above, since the fiber reinforced resin member 10 is used as the front pillar in the embodiment, the fragile portion 11 is formed such that a long side of the fragile portion 11 is oriented along a direction intersecting a longitudinal direction (that is, the Z direction) of the pillar. Accordingly, at the time of the side collision, the front pillar (an example of the fiber reinforced resin member 10) is bent via the fragile portion 11. In other words, it can be said that in the embodiment, the fragile portion 11 is provided, so that a deformation mode of the front pillar at the time of the side collision of the vehicle 100 is defined in advance.

The reinforcing members 20 cover the fragile portion 11 and reinforces a region near the fragile portion 11. In this manner, in the vehicle 100 of the embodiment, the reinforcing members 20 are provided for the purpose of strengthening the structure in the vicinity of the fragile portion 11. A specific material of the reinforcing member 20 is not particularly limited if the strength of the reinforcing member 20 is higher than that of the fiber reinforced resin member 10. Various known metal materials such as carbon steel plate, aluminum, and titanium are applicable to the reinforcing member 20.

The fixers 30 have a function of fixing the reinforcing members 20 to the fiber reinforced resin member 10. Specific examples of the fixer 30 include various known fixing methods such as bolt fastening, fixing with an adhesive, and welding. In the embodiment, as a specific example of the fixers 30, the reinforcing members 20 are fixed to the fiber reinforced resin member 10 by bolts fastening.

Next, a manner in which the reinforcing members 20 and the fixers 30 of the embodiment are arranged will be described with reference to FIG. 2. As can be understood from the drawing, in the embodiment, the reinforcing members 20 are fixed by the fixers 30 to the fiber reinforced resin member 10 from plural sides. For example, the fragile portion 11 penetrates the front pillar (the example of the fiber reinforced resin member 10). Then, the reinforcing members 20 are provided on the inside and outside of the vehicle body of the fiber reinforced resin member 10 so as to cover the fragile portion (for example, the opening).

At this time, as illustrated in FIG. 2, a pair of reinforcing members 20 may sandwich the front pillar (the example of the fiber reinforced resin member 10), and the fixers 30 (for example, bolt fastening) are disposed at upper and lower ends of the reinforcing member 20, respectively. With such a configuration, the reinforcing member 20 can compensate for the strength that is relatively lowered due to the formation of the fragile portion 11 on the front pillar (the example of the fiber reinforced resin member 10).

In the vehicle of the embodiment, when the impact force is input to the fiber reinforced resin member 10 from the outside of the vehicle body at the time of collision, the fragile portion 11 is preferentially (primarily) broken or destroyed, but the reinforcing members 20 covering the fragile portion 11 are fixed to the fiber reinforced resin member 10 with the fixers 30, and thus, it is avoided that a fractured end portion of the fiber reinforced resin member 10 becomes movable.

FIG. 2 illustrates that the sizes of the paired reinforcing members 20 in the vehicle height direction are substantially the same. Alternatively, the reinforcing members 20 may have different shapes. For example, the reinforcing member 20 on the outside of the vehicle body may be larger than that on the inside. FIG. 2 also illustrates that the thicknesses of the paired reinforcing members 20 sandwiching the front pillar (the example of the fiber reinforced resin member 10) are substantially the same. Alternatively, the reinforcing members 20 may have different thicknesses. For example, the reinforcing member 20 on the outside of the vehicle body may be thicker than that on the inside.

Position where Fragile Portion 11 is Provided in Vehicle 100

Next, a position of the fragile portion 11 formed on the fiber reinforced resin member 10 will be described with reference to FIG. 3. As is apparent from FIG. 3, in the vehicle 100 of the embodiment, a lower end of the front pillar is coupled to a front end of the side sill, and an upper end of the front pillar is coupled to a front end of the roof pillar. In this manner, the front pillars form a front part of a vehicle cabin space (the vehicle body) of the vehicle, and are disposed so as to support both sides of a windshield.

Meanwhile, in the vehicle 100 of the embodiment, a lower end of the center pillar is coupled to a central portion of the side sill in the X direction, and an upper end of the center pillar is coupled to a central portion of the roof pillar in the X direction. The roof pillars extend along the X direction at an upper part of the vehicle body, and constitute both sides of the roof of the vehicle 100. The side sill extends along the X direction at a lower portion of the side portion of the vehicle.

As described above, the fragile portion 11 of the embodiment is provided as a portion that is preferentially broken or destroyed by, for example, an impact force at the time of the side collision. Therefore, in some embodiments, as illustrated in FIG. 3, the fragile portion 11 of the embodiment is provided in a region P1 where the impact stress at the time of collision (such as side collision or rollover) is relatively high in the fiber reinforced resin member 10.

Specific examples of the region P1 include a front end or a rear end of the roof pillar, the upper end portion or the root portion of the center pillar, and both ends of the side sill, in addition to a root of the front pillar illustrated in FIG. 3.

In some embodiments, the fragile portion 11 of the embodiment is provided in a region P2 where a wrinkle occurrence rate is relatively high during manufacturing of the fiber reinforced resin member 10. In other words, since the strength of a portion where a wrinkle occurs is relatively lower than that of other portions, it can be said that the region P2 originally has a function of the fragile portion 11 of the embodiment. In general, a wrinkle occurrence rate tends to be high at a curved (R) portion in the shape of the fiber reinforced resin member 10.

Specific examples of the region P2 include a coupling portion between the lower end of the center pillar and the side sill illustrated in FIG. 3, the upper end or the lower end of the center pillar, the lower end of the front pillar, and the like.

In some embodiments, as illustrated in the region P2 of FIG. 3, the plural fiber reinforced resin members 10 are coupled to each other by the reinforcing member 20. In other words, in the region P2, the lower end of the center pillar and the side sill are coupled to each other by the reinforcing member 20. In this manner, the reinforcing member 20 of the embodiment may have a function of coupling the different fiber reinforced resin members 10 to each other (in the above-described example, the front pillar and the side sill).

In some embodiments, as illustrated in FIG. 3, in the vehicle 100, an auxiliary fragile portion 12 that is a counterpart of the fragile portion 11 is further provided in a region (region P3) different from the region where the fragile portion 11 is provided. Here, the term "counterpart" refers to a portion to which an impact is transmitted following the fragile portion 11 at the time of the above-described collision (that is, the side collision). In other words, in the embodiment, since the fragile portion 11 is disposed at the lower end of the front pillar, the auxiliary fragile portion 12 is disposed at the upper end of the front pillar on the opposite side. Specific examples of the region P3 where the auxiliary fragile portion 12 is provided include the front end or the rear end of the roof pillar, both sides of the side sill, the upper end or the lower end of the center pillar, and the like.

Accordingly, for example, after the fragile portion is preferentially (primarily) broken or destroyed at the time of the side collision of the vehicle 100, the auxiliary fragile portion 12 is secondarily broken or destroyed. Even when the fragile portion 11 is not preferentially (primarily) broken or destroyed at the time of the side collision of the vehicle 100 for some reasons, the auxiliary fragile portion 12 that is next fragile is complementarily broken or destroyed. Thus, it is possible to avoid unintended brittle fracture at other portions.

According to the vehicle 100 of the embodiment, for example, the impact force is concentrated on the fragile portion 11 at the time of the side collision. The fragile portion 11 is preferentially broken or destroyed at the time of the side collision. Accordingly, the impact force due to the collision can be absorbed more effectively. In addition to this, in the embodiment, since the fragile portion 11 is formed in advance such that the fragile portion 11 is preferentially (primarily) broken or destroyed, it is possible to prevent a portion other than the fragile portion 11 in the fiber reinforced resin member 10 from being broken or destroyed. Accordingly, it is possible to avoid unintended brittle fracture at other portions.

Modification Example 1

Figure 4:
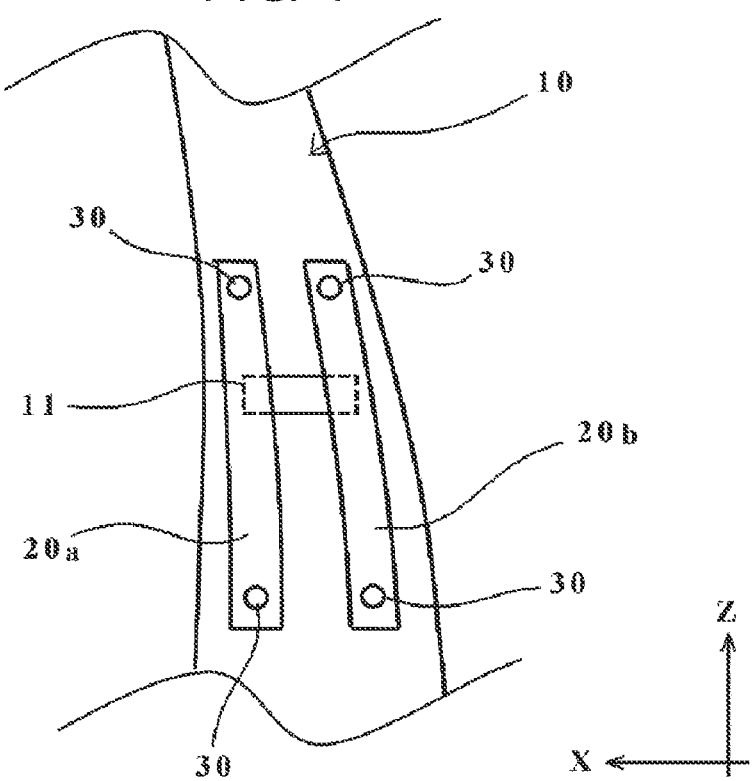
FIG. 4 is a schematic view partially illustrating a vehicle including a fiber reinforced resin member of a modification example 1.

Next, with reference to FIG. 4, a vehicle 110 of a modification example 1 obtained by modifying the above-described embodiment will be described. In the following, members having the same functions as those of the above-described embodiment will be given the same reference numbers, and description thereof will be omitted as appropriate. It is noted that the same applies to a modification example 2 which will be described later.

In other words, in the above-described embodiment, the reinforcing member 20 that covers a part of one surface of the fiber reinforced resin member 10 is configured with a single member. On the other hand, in the modification example 1, as illustrated in FIG. 4, plural reinforcing members 20a and 20b cover a part of one surface of the fiber reinforced resin member 10.

In this manner, in the disclosure, the single reinforcing member 20 may be used to cover the fragile portion 11 on one surface (for example, a surface on the outside of the vehicle body) of the fiber reinforced resin member 10, or the plural reinforcing members 20 may be used to each cover at least a part of the fragile portion 11.

At this time, the plural reinforcing members 20a and 20b may be made of the same material, or may have different strengths, for example, may be configured with a steel plate and an aluminum plate, respectively. The plural reinforcing members 20a and 20b may have the same shape or different shapes. The plural reinforcing members 20a and 20b may have different thicknesses or the same thicknesses.

Modification Example 2

Next, with reference to FIGS. 5A and 5B, a vehicle 120 of a modification example 2 obtained by modifying the above-described embodiment will be described.

In other words, in the above-described embodiment and the modification example 1, bolt fastening is used as the fixer 30. On the other hand, in the modification example 2, as illustrated in FIGS. 5A and 5B, the reinforcing member 20 is fixed to one surface of the fiber reinforced resin member 10 by the fixers 30 which are an adhesive. Various known adhesives used in automobiles may be employed as such an adhesive.

The fragile portion 11 of the modification example 2 is not a weight-reducing opening formed by removing a part of the fiber reinforced resin member 10. Instead, the fragile portion 11 of the modification example 2 is configured with a portion having a relatively thin thickness as compared with other portions. In other words, as illustrated in FIGS. 5A and 5B, the fiber reinforced resin member 10 of the modification example 2 has different thicknesses (d1 to d3) in the vehicle width direction. Of these thicknesses d1 to d3, a region having the smallest thickness d1 is the fragile portion 11.

In this way, it is not necessary to make the fragile portion 11 fragile by removing a part of the fiber reinforced resin member 10. The fragile portion 11 may be made fragile by making a thickness of the fragile portion 11 different from those of the other portions.

Figure 5A:
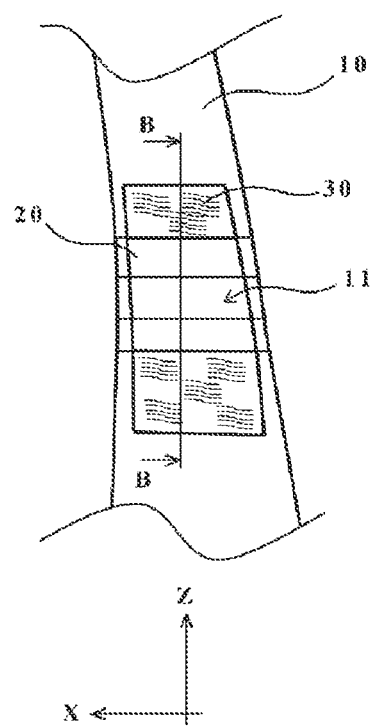
FIGS. 5A and 5B are schematic views partially illustrating a vehicle including a fiber reinforced resin member of a modification example 2.
Figure 5B:
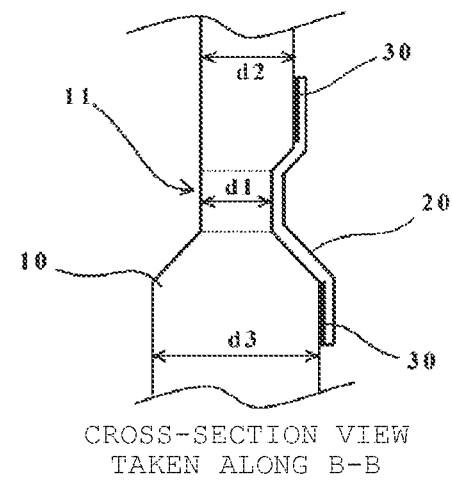

As can be understood from FIGS. 5A and 5B, the reinforcing members 20 is not disposed on both one surface and the other surface (in this example, surfaces on the inside and the outside of the vehicle body) of the fiber reinforced resin member 10, but the reinforcing member 20 is simply disposed on one surface (for example, a surface on the outside of the vehicle body) of the fiber reinforced resin member 10.

In this way, the reinforcing members 20 of the disclosure do not need to be disposed in pairs on both surfaces of the fiber reinforced resin member 10, but the reinforcing members 20 may be disposed at least on one surface of the fiber reinforced resin member 10.

The embodiments and modification examples of the disclosure have been described in detail with reference to the accompanying drawings. It is noted that the disclosure is not limited to such embodiments and modification examples. It is apparent that one skilled in the art to which the disclosure relates may attempt to further modify the embodiments and the modification examples within the scope of the technical ideas described in claims, and it is to be understood that those modifications also naturally fall within the technical scope of the disclosure.

According to the disclosure, it is possible to avoid unintended brittle fracture of the fiber reinforced resin member while improving the impact force absorption at the time of the side collision of the vehicle.

The invention claimed is:

1. A vehicle comprising:
a fiber reinforced resin member at least comprising a fragile portion;
a reinforcing member that covers the fragile portion and reinforces the fragile portion; and
a fixer that fixes the reinforcing member to the fiber reinforced resin member, wherein
the fiber reinforced resin member comprises a plurality of fiber reinforced resin members and the reinforcing member comprises a plurality of reinforcing members, and the fiber reinforced resin members are coupled to each other by the reinforcing members.

2. The vehicle according to claim 1, wherein the fragile portion is provided in a region where an impact stress at a time of collision perpendicular to the fiber reinforced member is high in the fiber reinforced resin member.

3. The vehicle according to claim 2, wherein the fragile portion is provided in a region where a wrinkle occurrence rate is high during manufacturing of the fiber reinforced resin member.

4. The vehicle according to claim 3, wherein an auxiliary fragile portion that is a counterpart of the fragile portion is further provided at a position different from that of the fragile portion.

5. The vehicle according to claim 2, wherein an auxiliary fragile portion that is a counterpart of the fragile portion is further provided at a position different from that of the fragile portion.

6. The vehicle according to claim 1, wherein the fragile portion is provided in a region where a wrinkle occurrence rate is high during manufacturing of the fiber reinforced resin member.

7. The vehicle according to claim 6, wherein an auxiliary fragile portion that is a counterpart of the fragile portion is further provided at a position different from that of the fragile portion.

8. The vehicle according to claim 1, wherein an auxiliary fragile portion that is a counterpart of the fragile portion is further provided at a position different from that of the fragile portion.

9. A vehicle comprising:
a fiber reinforced resin member at least comprising a fragile portion;
a first reinforcing member that is disposed on a first surface of the fiber reinforced resin member;
a second reinforcing member that is disposed on a second surface of the fiber reinforced resin member, the second surface being other than the first surface; and
a first fixer that fixes the first reinforcing member to the fiber reinforced resin member, and a second fixer that fixes the second reinforcing member to the fiber reinforced resin member wherein
a pair of the first reinforcing member and the second reinforcing member sandwich the fiber reinforced resin member including the fragile portion.

10. The vehicle according to claim 9, wherein
the first reinforcing member and the second reinforcing member cover the fragile portion of the fiber reinforced resin member.

11. The vehicle according to claim 9, wherein
the first reinforcing member and the second reinforcing member have different shapes.

12. The vehicle according to claim 9, wherein
the first reinforcing member and the second reinforcing member have different thicknesses.

13. The vehicle according to claim 9, wherein
the first reinforcing member includes a first sub-member and a second sub-member other than the first sub-member, wherein
a first sub-member and a second sub-member other than the first sub-member cover a part of one surface of the fiber reinforced resin member.

14. The vehicle according to claim 9, wherein
the fragile portion is a rectangular weight-reducing opening formed by removing a part of the fiber reinforced resin member.

15. The vehicle according to claim 9, wherein
the fragile portion is configured with a portion having a relatively thin thickness as compared with other portions of the fiber reinforced resin member.

16. The vehicle according to claim 9, wherein
the fragile portion is configured with a portion having a smallest thickness as compared with other portions of the fiber reinforced resin member.

* * * * *